No. 21,837.
W. KEARNEY.
HOISTING JACK.
PATENTED OCT. 19, 1858.
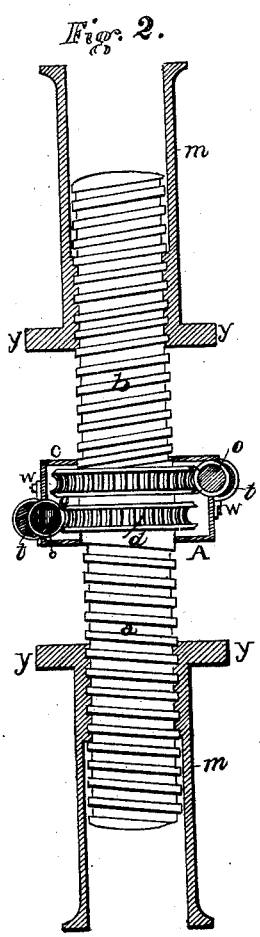
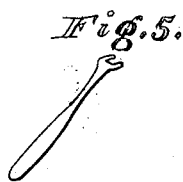
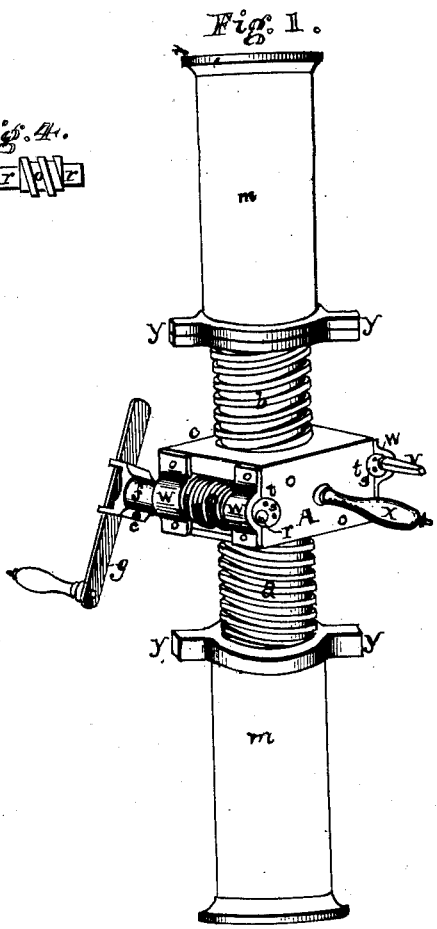
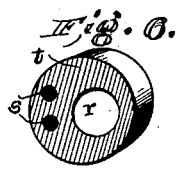
Witnesses
Wm M Gooding
J O Budd
Inventor
William Kearney

UNITED STATES PATENT OFFICE.

WILLIAM KEARNEY, OF NEWARK, NEW JERSEY.

HOISTING-JACK.

Specification of Letters Patent No. 21,837, dated October 19, 1858.

*To all whom it may concern:*

Be it known that I, WILLIAM KEARNEY, of the city of Newark, in the county of Essex and State of New Jersey, have invented certain Improvements in Hoisting-Jacks; and I do declare the following to be a full and exact description thereof, reference being had to the drawings accompanying this specification and which make part of the same.

The nature of my invention consists in combining a screw shaft with a right and left thread, two concave worm wheels, two worms with different threads, the journals of the worms working in eccentrics, two nuts or boxes and an adjustable crank, by which the speed and power of the jack may be varied as in use may be required.

Figure 1 is a perspective view of the jack. Fig. 2 is a sectional view. Figs. 3 and 4 are the worms. Fig. 5 is a fork for moving the eccentrics; Fig. 6, an eccentric; Fig. 7, the crank socket piece.

The letters refer to the same parts in each figure.

Upon the two way threaded shaft, $b$, $a$, at the middle of its length there is secured two worm wheels with concave faces $d$, $d$, the angle of the threads upon one being suited to a worm which has but one thread around its surface, the angle of the other being adapted to a worm having two threads. In the former case one revolution of the worm moves the wheel and the screw shaft forward one tooth of the wheel, while the other moves them two teeth, or double the distance in one revolution of the worm. The worm wheels are inclosed and the worms held to their places by the box A.

The eccentrics $t$ have bearings formed in part by the side of the box A and in part by the caps $w$, $w$, $w$. The journals of the worms being in the eccentrics, and nearer to one side than to the other (to constitute an eccentric) it is seen that when the near side is turned toward the wheel $d$ in the box A the worm will be in gear and when turned from the shaft the worm will be out of gear, the journals of the worms, $r$, $r$, being carried forward or back by turning the eccentrics, $t$. The means provided for turning the eccentrics is a fork (Fig. 5) with two prongs fitted to the two holes $s$, $s$, in each of the eccentrics.

One end of each worm shaft is elongated ($v$,) and made square with a slight taper to receive the socket ($f$) which forms part of the adjustable crank, $g$. The crank is formed with a socket piece having two lips through which are mortises as shown by Fig. 7. The bar $g$ is fitted to these mortises and slid through before the handle is screwed in to the bar, the projections on the edge of the bar at the opposite end to the handle prevent its coming out of the socket piece when the handle is fast. The crank can be of any desired length as the bar $g$ can be held at any place by the set screw, $e$, or by a wedge passing between the bar and the socket piece between the mortises.

A handle $x$ is put into the side of the box A, holes can be bored and tapped in any part of the box so that the handle can be put in any position which the convenience of the workman may require.

The threads of the nuts are part of the cases or boxes $m$, as shown in Fig. 2, and as one is a right and the other a left thread screw both cases are simultaneously forced to or from the middle of the screw shaft $a$, $b$, by action of the worms and wheels. Projections are put upon the ends of these cases next the box A, to enable the jack to be used as a clamp to press things together or tear them apart as the case may be, the projections are shown by the letter, $y$.

By these means a variation of the speed or the power of the jack can be made to suit the immediate convenience of the operator, by throwing both wheels into gear and using a long handle or a short one as the case may need a very quick operating jack is ready for use, but when more power is required either wheel can be put out, the one being just half the power of the other, and even then another scale of differences in power is at command by shortening or lengthening the leverage of the crank. Another convenience is that when it has taken the full power and slowest motion of the jack and it is required to lower the load it has lifted, the wheels not being thrown out of gear the box A being turned with the shaft, lowers the load two threads of the screws at every turn, whereas other jacks take as many turns of their cranks to lower a load as to raise it.

There being no novelty in the construction of the parts separately considered except perhaps in the adjustable crank, I therefore do not claim them singly.

What I do claim and desire to secure by Letters Patent is—

The combination of the screw shaft, two or more concave faced worm wheels, two or more worms of different threads the journals of the worms in eccentrics, two nut cases or boxes, with an adjustable crank; in the manner and for the purpose herein above specified.

WILLIAM KEARNEY.

Witnesses:
WM. M. GOODING,
J. BUDD.